United States Patent
Reiser et al.

(10) Patent No.: US 9,857,481 B2
(45) Date of Patent: Jan. 2, 2018

(54) APPARATUS FOR READING OUT X-RAY INFORMATION STORED IN A STORAGE PHOSPHOR LAYER

(71) Applicant: Agfa HealthCare N.V., Mortsel (BE)

(72) Inventors: Georg Reiser, Mortsel (BE); Stephan Mair, Mortsel (BE); Bernhard Stadtmueller, Mortsel (BE)

(73) Assignee: AFGA HEALTHCARE NV, Mortsel (BE)

( * ) Notice: Subject to any disclaimer, the term of this patent is extended or adjusted under 35 U.S.C. 154(b) by 0 days.

(21) Appl. No.: 15/302,219

(22) PCT Filed: Apr. 8, 2015

(86) PCT No.: PCT/EP2015/057571
§ 371 (c)(1),
(2) Date: Oct. 6, 2016

(87) PCT Pub. No.: WO2015/155210
PCT Pub. Date: Oct. 15, 2015

(65) Prior Publication Data
US 2017/0031036 A1    Feb. 2, 2017

(30) Foreign Application Priority Data
Apr. 8, 2014   (EP) .................................... 14163871

(51) Int. Cl.
*G01N 23/04*   (2006.01)
*G01T 1/20*    (2006.01)

(52) U.S. Cl.
CPC ................. *G01T 1/2014* (2013.01)

(58) Field of Classification Search
CPC ............................... G01T 1/20; G01T 1/2014
USPC .................... 250/585, 459.1, 458.1
See application file for complete search history.

(56) References Cited

U.S. PATENT DOCUMENTS

| | | | |
|---|---|---|---|
| 2013/0101261 A1* | 4/2013 | Cadier | C03B 37/01838 385/126 |
| 2013/0234048 A1* | 9/2013 | Reiser | H04N 1/053 250/459.1 |

FOREIGN PATENT DOCUMENTS

| | | |
|---|---|---|
| EP | 0 032 521 A1 | 7/1981 |
| EP | 0 892 283 A1 | 1/1999 |
| EP | 1 150 137 A2 | 10/2001 |

OTHER PUBLICATIONS

Official Communication issued in International Patent Application No. PCT/EP2015/057571, dated Jun. 23, 2015.

* cited by examiner

*Primary Examiner* — David Porta
*Assistant Examiner* — Meenakshi Sahu
(74) *Attorney, Agent, or Firm* — Keating and Bennett, LLP

(57) ABSTRACT

An apparatus for reading out X-ray information stored in a storage phosphor layer includes a light source for generating stimulating light which can stimulate the storage phosphor layer to emit stimulated emission, an optical fiber, in particular a single mode fiber, which is optically coupled to the light source and generates a stimulating light beam from the stimulating light, and a deflection element for deflecting the stimulating light beam to move over the storage phosphor layer.

12 Claims, 3 Drawing Sheets

APPARATUS FOR READING OUT X-RAY INFORMATION STORED IN A STORAGE PHOSPHOR LAYER

CROSS REFERENCE TO RELATED APPLICATIONS

This application is a 371 National Stage Application of PCT/EP2015/057571, filed Apr. 8, 2015. This application claims the benefit of European Application No. 14163871.8, filed Apr. 8, 2014, which is incorporated by reference herein in its entirety.

BACKGROUND OF THE INVENTION

1. Field of the Invention

The present invention relates to an apparatus for reading out X-ray information stored in a storage phosphor layer.

2. Description of the Related Art

One possibility for recording X-ray images is to store the X-ray radiation passing through an object, for example a patient, as a latent image in a so-called storage phosphor layer. In order to read out the latent image, the storage phosphor layer is irradiated with stimulation light and thereby stimulated to emit stimulated emission. The stimulated emission, the intensity of which corresponds to the latent image stored in the storage phosphor layer, is detected by an optical detector and converted into electrical signals. The electrical signals are further processed as required and finally made available for analysis, in particular for medical and/or diagnostic purposes, by being displayed on a corresponding display device, such as a monitor or printer.

In apparatuses and methods according to the prior art, the stimulation light beam is deflected by a rotating polygon mirror and conveyed over the storage phosphor layer.

SUMMARY OF THE INVENTION

Preferred embodiments of the present invention provide an apparatus for reading out X-ray information stored in a storage phosphor layer providing high quality X-ray images in a compact and reliable way.

The apparatus according to a preferred embodiment of the invention comprises a light source for generating stimulating light which can stimulate the storage phosphor layer to emit stimulated emission, an optical fiber, in particular a single mode fiber, which is optically coupled to the light source and generates a stimulating light beam from the stimulating light, and a deflection element for deflecting the stimulating light beam to move over the storage phosphor layer.

An optical fiber is a preferably flexible and cylindrically shaped dielectric wave guide that transmits light along its axis by the process of total internal reflection.

Preferably, the fiber comprises a core surrounded by a cladding layer, which are made of dielectric materials.

More preferably, to confine the optical signal in the core, the refractive index of the core is greater than that of the cladding. Preferably, the radius of the core of the fiber is not larger than a radius value depending on the wavelength of the stimulating light.

Preferably, the optical fiber is a polarization-maintaining optical fiber, in particular a polarization-maintaining single-mode fiber. Preferably, a polarization-maintaining optical fiber is an optical fiber in which linearly polarized light, which is launched into the fiber, maintains a linear polarization during propagation and exits the fiber in a specific linear polarization state. There is little or no cross-coupling of optical power between the two polarization modes. As a result, the generated stimulating light beam having a defined polarization and impinging in a pre-defined angle of incidence on optical components of the apparatus, like dielectric mirrors, fiber-optic beam splitters or deflection elements, is reflected and/or transmitted with a pre-defined behavior and efficiency, so that scanning the storage phosphor layer with the deflected stimulating light beam yields high quality X-ray images.

Preferably, the profile of the beam emerging from the fiber end is round, in particular circular, and free of astigmatism. This is of particular advantage when a resonantly or non-resonantly oscillating mirror, in particular a galvanometer mirror, is used as a deflection element for deflecting the stimulating light beam. Preferred embodiments of the invention are based upon the idea that by the use of an optical fiber, the light source can be partially separated from the place of the generation of the stimulating light beam. By this, the light source can be arranged in a different location than the actual pre-scan optics for forming and directing the stimulating light beam. As a result, on the one hand, the dimensions of the actual module for providing stimulating light to the storage phosphor layer can be reduced, and on the other hand, a cooling module for cooling down the light source does not need to be inserted in the actual optical module comprising in general a pre-scan optics and a post-scan-optics. This reduces the risk of a failure, for example because of a water leak in the cooling module. Furthermore, the actual emitting fiber end of the optical fiber and its support in the apparatus for reading out X-ray information does not need to have particular properties for heat conduction or cooling. In addition, the so-formed stimulating beam has a good beam quality exhibiting a beam quality factor $M^2$ near to 1, preferably between 1 and 1.1, in particular of approximately 1.05, wherein $M^2$ correspond to the ratio of the beam parameter product (BPP) of an actual beam to that of an ideal Gaussian beam at the same wavelength. Moreover, in the case of a single-mode fiber the light of the light source undergoes only little dispersion, even for long transmission distances in the optical fiber. Preferably, the light source is a monochromatic light source so that dispersion in the optical fiber is particularly small.

In summary, preferred embodiments of the invention allow for reading out high quality X-ray images in a compact and reliable way.

In a preferred embodiment, the light source and the optical fiber form together a fiber coupled laser diode module, also known as pigtailed laser diode. Pigtailed laser diodes are commercially available with a multitude of different properties regarding emission spectra, modes and dimensions. Therefore, pigtailed laser diodes are a cost-effective possibility for designing the inventive apparatus in a lot of varieties.

In a further preferred embodiment, the apparatus comprises an optics forming the stimulating light beam, in particular a round lens and/or convex lens. Dependently on the properties of the light source and the optical fiber, a generated stimulating light beam can be formed to be adapted for reading out X-ray information. Preferably, the optics comprises a so-called best form lens having a minimized aberration. The lens, in particular best form lens, may preferably be a biconvex round lens, a plano-convex round lens and/or a concave-convex round lens. Alternatively or additionally, the optics comprises a free-form lens and/or a gradient-index (GRIN) collimator.

In a further preferred embodiment, the optics is a collimator. In general, a light beam leaving the fiber end of an optical fiber has a certain divergence due to scatterings in the optical fiber and/or diffraction at the fiber end. This divergence can be corrected by the collimator.

In a further preferred embodiment, the optical fiber further serves as a spectral filter. Dependently on the material of the optical fiber, the spectrum of the stimulating light can be modified, for example by absorbing certain spectral lines in the stimulating light. Alternatively or additionally, the optical fiber also serves as a spectral filter which eliminates at least a part of a spectral region of the light emitted by the laser diode, in particular a broad background spectrum.

In a further preferred embodiment, the optical fiber maintains the polarization of the stimulating light.

In a further preferred embodiment, the optical fiber is removably coupled to the light source. By this, different optical fibers can be used in combination with a single light source to generate stimulating light beams with different spectra, polarizations and/or forms.

In a further preferred embodiment, a fiberoptic splitter is arranged in the optical fiber to couple out at least a portion of the stimulating light, the fiberoptic splitter being configured to feed a feedback sensor for sensing the intensity of the stimulating light beam. By arranging a fiberoptic splitter in the optical fiber, a separate mirror for coupling out a part of the stimulating light beam in the optical module can be omitted. This allows for a better control of the amount of light coupled out for supplying the feedback sensor and also to reduce the intensity of the supplied, i.e. the coupled-out, light to a minimum. Furthermore, by omitting a separate mirror for coupling out, the dimensions of the apparatus for reading out X-ray information can be reduced considerably, since one bulky element (the mirror) is replaced by the optic splitter. Last but not least, the fiberoptic splitter allows for a particularly flexible positioning of the feedback sensor, which in turn facilitates a compact construction of the apparatus.

In a further preferred embodiment, the apparatus comprises a detector for detecting stimulated emission emitted by the storage phosphor layer while the deflected stimulation light beam moves over the storage phosphor layer in a first direction of movement or while a deflection element moves in a first direction. Preferably, the detector does not detect any emission light when the deflected stimulation light beam for the deflection element moves in the opposite direction of movement or direction. In particular, the light source is switched off here so that only a notional stimulation light beam is moved over the storage phosphor layer in the opposite direction of movement.

Alternatively or additionally, the apparatus comprises a detector being configured to detect stimulated emission emitted by the storage phosphor layer while the deflected stimulation light beam moves over the storage phosphor layer both in a first direction of movement, also called trace direction, and in a second direction of movement, which is opposite to the first direction of movement, also called retrace direction.

In a further preferred embodiment, the apparatus comprises a drive device for driving the deflection element by delivering drive energy to the deflection element dependently upon a location of the deflected stimulation light beam and/or dependently upon a position of the deflection element. Preferably, the drive device is configured in such a way that the delivery of drive energy to the deflection element is triggered when the deflected stimulation light beam is moved over the storage phosphor layer in a second direction of movement opposite to the first direction of movement or when the deflection element moves in a second direction opposite to the first direction. This means that the delivery of drive energy is triggered when the deflected stimulation light beam passes over at least one of the two sensor elements during the movement in the second direction of movement and is accordingly located in a specific position and/or direction. The same applies to the location and movement of the deflection element. In this way, the deflection element is driven during the retrace of the deflected stimulation light beam. By this, one achieves the advantage that the irregularities in the oscillation of the deflection element possibly occurring temporarily due to a drive pulse have already faded away again when the deflected stimulation light beam moves over the storage phosphor layer in the subsequent movement in the first direction of movement. In this way a particularly high degree of uniformity is easily achieved in the deflection and oscillation behavior.

In a further preferred embodiment, the apparatus comprises at least one sensor element for detecting the location of the deflected stimulation light beam and/or a pick-up for detecting the position of the deflection element.

In a further preferred embodiment, the deflection element has a magnetic element and the drive device has an electromagnetic unit, which interacts with the magnetic element to deliver drive energy to the deflection element. In this way, precise, controllable delivery of drive energy is easily implemented.

Alternatively or additionally, drive energy can be delivered to the deflection element by other kinds of drives, e.g. a motor drive.

In a further preferred embodiment, the deflection element has a reflective surface which is driven by the drive device to oscillate. The reflective surface serves in order to deflect the stimulating light beam.

In a further preferred embodiment, the deflection element has a resonance frequency and the drive device drives the deflection element at its resonance frequency.

Preferably, the storage phosphor layer is plane while being read out. According to an alternative preferred embodiment, the apparatus comprises a conveyance device for curving the storage phosphor layer during the read-out. In this case, the storage phosphor layer is preferably provided on a flexible carrier and/or substrate layer. The curvature of the storage phosphor layer is preferably cylindrically concave so that the stimulation light beam deflected by the deflection element always strikes the storage phosphor layer perpendicularly on its path over the storage phosphor layer. In this way, when reading out planar storage phosphor layers, the generally required post-scan optics and calculative elimination of distortion in the read out X-ray image can be dispensed with. The structure of the apparatus and the method thus become even simpler, without any negative impact upon the image quality.

Preferably, the curved storage phosphor layer is stationary and the optical fiber and the detector are moved, in particular translated, relative to the non-moving storage phosphor layer. In this preferred embodiment, apart from the detector only the optical fiber is moved, while the light source remains stationary.

Further preferred and/or alternative aspects and advantages of the invention are elucidated as follows.

As a light source the following light sources are preferably used: vertical-cavity surface-emitting laser (VCSEL) lasers, gas lasers, e.g. He—Ne laser, solid-state lasers, e.g. Nd:YAG laser, edge-emitting laser diodes, e.g. Fabry-Perot laser diodes, fiber lasers.

Another advantage of the invention is achieved in terms of the electronics design. Namely, separate electronic boards are possible due to the "flexibility" of the laser diode's location and the integration of the laser diode socket into the board.

Moreover, possible losses due to coupling of laser light into the optical fiber may be compensated or even overcompensated by using high-power laser diodes. Moreover, a part of these losses may be at least partly compensated due to the reduced losses when forming the beam by comparatively low exit divergence of the light and by a smaller total number of optical components in the further beam forming.

Although edge-emitting laser diodes exhibit significant differences in the beam divergence of the exiting light beam, the divergence of stimulating light beams exiting from the optical fiber will exhibit much lower differences. Thus, no additional adjustment by telescope or lenses of different focal distance or apertures is required for beam shaping.

With the fiber-coupled laser diode, a spatial separation between the light source (i.e. laser diode with respective electronics) and the remaining part of the optical module is possible. Apart from the already mentioned advantage of enhanced flexibility in terms of optical and/or mechanical and/or electronic design, the light source can be easily prevented from vibrations, e.g. due to the oscillating deflection element, and is therefore no longer sensitive to such kind of vibrations.

BRIEF DESCRIPTION OF THE DRAWINGS

Further advantages, features and possible applications of the present invention emerge from the following description in connection with the figures showing.

DETAILED DESCRIPTION OF THE PREFERRED EMBODIMENTS

Figure 1:
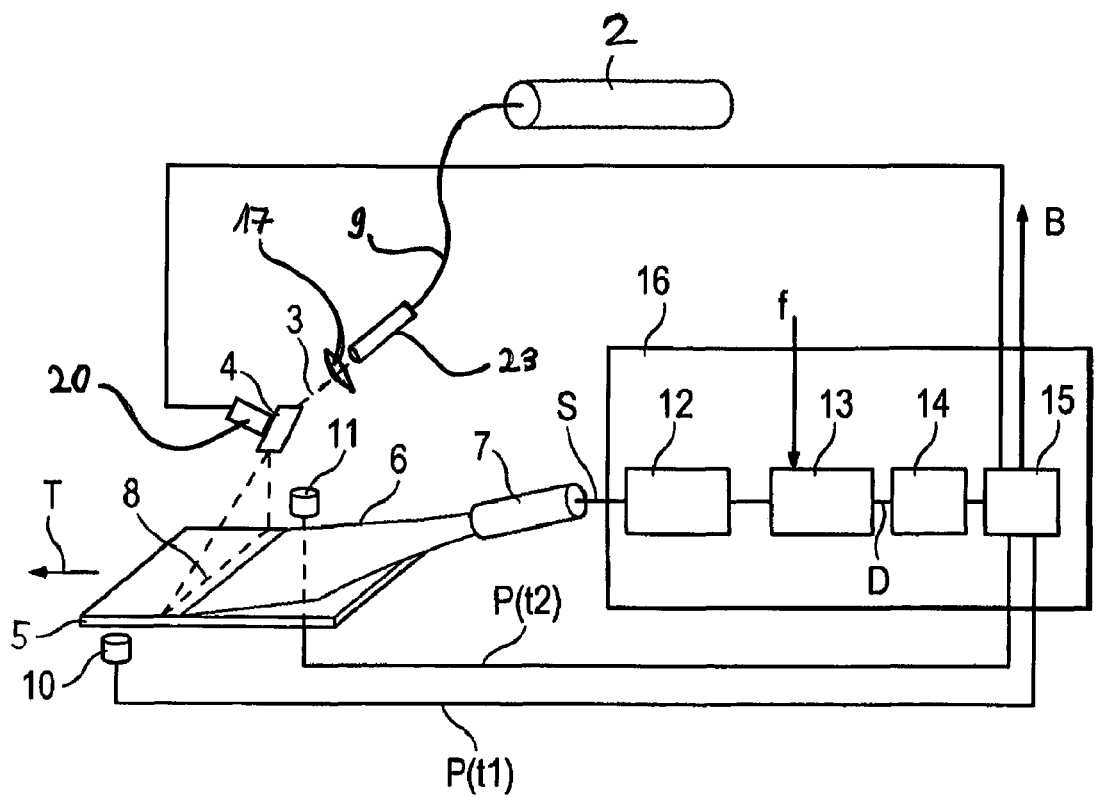
FIG. 1 is a schematic illustration of a preferred embodiment of the inventive apparatus for reading out X-ray information from a storage phosphor layer.

FIG. 1 shows an apparatus for reading out a storage phosphor layer 1. By a laser diode 2, stimulating light is generated and coupled into an optical fiber 9, particularly a glass fiber, wherein the stimulating light propagates nearly lossless to a fiber end 23. At the fiber end 23, the optical fiber 9 emits the stimulating light in a stimulating light beam 3. The stimulating light beam 3 is directed towards a deflection element 4 which deflects the stimulating light beam 3 such that the deflected stimulating light beam 3' moves over the storage phosphor layer 5 to be read out along a line 8. Preferably, a biconvex lens 17, in particular a collimator, is arranged in the propagation line of the stimulating light beam 3 between the fiber end 23 and the deflection element 4. The deflection element 4 preferably has a reflective surface, in particular in the form of a mirror, which is caused to oscillate by drive device 20.

During the movement of the deflected stimulating light beam 3' over the storage phosphor layer 5, the latter emits emission light dependently upon the X-ray information stored in said storage phosphor layer 5 which is preferably collected by an optical collecting device 6, for example a bundle of optical fibers or an appropriate mirror device, and is preferably detected by an optical detector 7, preferably a photomultipler (PMT), and is thereby converted into a corresponding detector signal S.

The detector signal S is conveyed to a processing device 16 in which image signal values B for individual pixels of the read out X-ray image are derived. If the read out line 8 is composed, for example, of 1000 pixels, 1000 corresponding image signal values B are derived from the detector signal S obtained when reading out the line 8.

By conveying the storage phosphor layer 5 in conveyance direction T by a conveyance device (not shown), a successive read-out of individual lines 8 of the storage phosphor layer 5 is achieved, and so a two-dimensional X-ray image composed of individual pixels, each having a corresponding image signal value B, is obtained. If the number of lines 8 read out in conveyance direction T is for example 1500, with 1000 pixels for each line 8, a total of 1500 times 1000 pixels are obtained for the read out X-ray image.

It is basically also possible to mount the storage phosphor layer 5 stationary and to move the remaining components, in particular the laser diode 2, the deflection element 4, the collecting device 6 and the detector 7 relative to the storage phosphor layer 5.

Preferably, the detector signal S is first of all filtered by a low pass filter 12, whereby higher frequency portions of the detector signal S, in particular noise components, being eliminated. The filtered detector signal S is then conveyed to an analogue to digital converter 13 and sampled here with a sampling frequency f, with every sampling process a detector signal D being obtained in respective digital units. The sampling of the detector signal S in the analogue to digital converter 13 is preferably implemented using the so-called sample and hold principle according to which, when sampling, the respective current analogue signal height of the detector signal S at the analogue to digital converter 13 at a sampling time is held and converted into a corresponding digital detector signal value D. After intermediate storage in the memory 14, the image signal values B are calculated from the detector signal values D in a control unit 15.

The apparatus shown further comprises preferably two sensors 10 and 11 which are arranged on both sides of the storage phosphor layer in such a way that the deflected stimulation light beam 3' can strike the latter before and after the light beam 3' passes or has passed over the storage phosphor layer 5 along the line 8. If the stimulating light beam 3 is deflected with the deflection element 4 towards the line 8, the deflected light beam 3' first of all passes the first sensor 10 and then the second sensor 11 before actually sampling the storage phosphor layer 5 along line 8. The light of the deflected stimulation light beam 3' is thereby detected by the two light-sensitive sensors 10 and 11 and converted into corresponding electrical signals P(t1) and P(t2) at times t1 and t2 and conveyed to the control unit 15 of the processing device 16.

The control unit 15 is connected to the drive device 20 in order to drive the deflection element 4 and to control the latter in such a way that the deflection element 4 is only driven actively by the delivery of drive energy from the drive device 20 when or after the deflected stimulation light beam 3' exhibits a specific direction and/or position. In the example shown, the deflected stimulation light beam 3' passes over at least one of the two sensors 10 and 11, whereupon said stimulation light beam 3' sends an electric pulse P to the control unit 15 which—optionally after a specifiable time delay—controls the drive device 20 in such a way that the latter intermittently delivers drive energy, in particular in the form of a drive energy pulse, to the oscillating deflection element 4 and thereby maintains its oscillation, preferably in the range of a resonance frequency of the deflection element 4.

Figure 2:
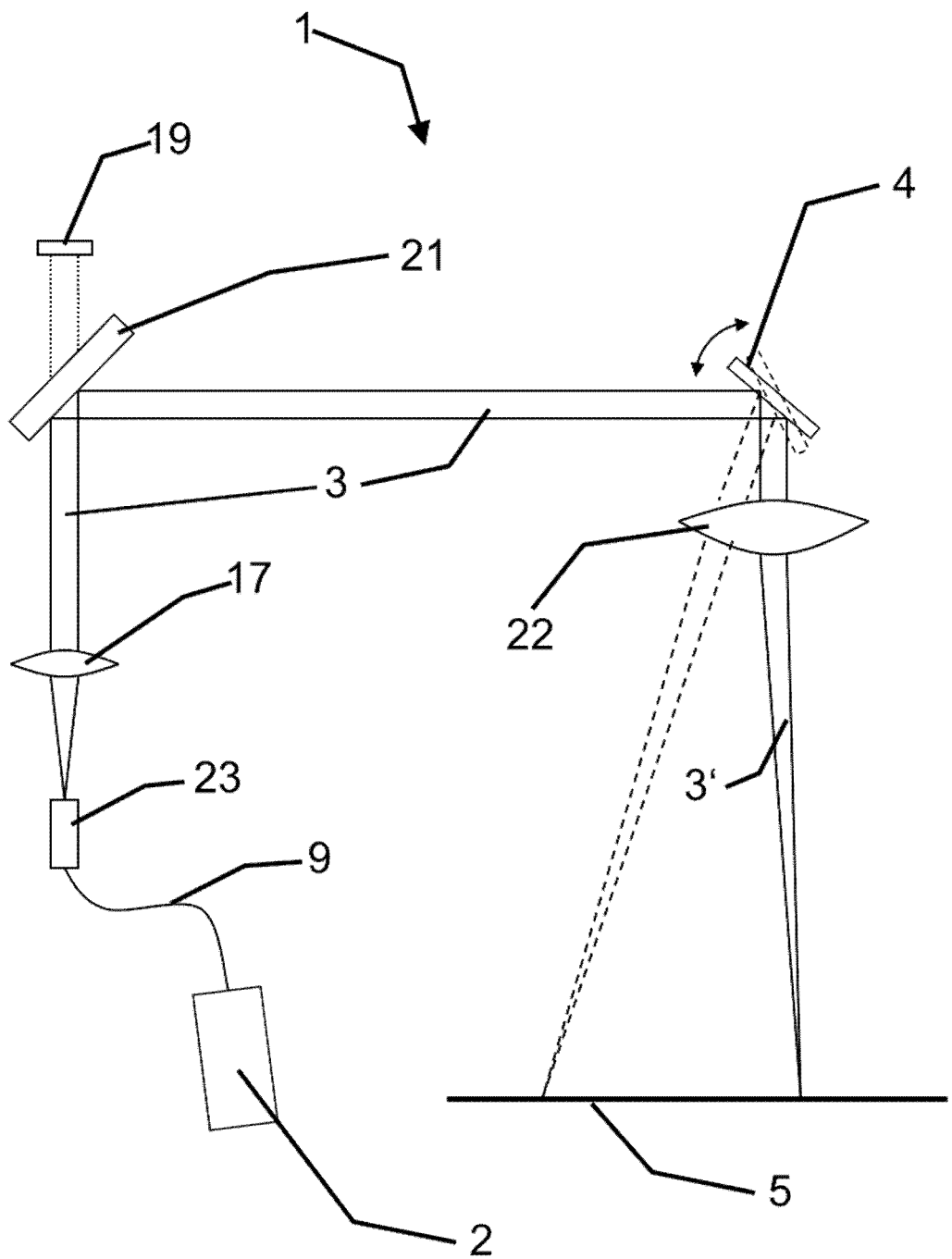
FIG. 2 is a schematic illustration of a preferred embodiment of an optical module serving to provide stimulating light to the storage phosphor layer.

FIG. 2 shows a more detailed illustration of a preferred embodiment of an optical module of the inventive apparatus for reading out X-ray information stored in a storage phosphor layer 5, namely an optical module for sampling the storage phosphor layer 5 with a stimulating light beam 3 generated by a light source 2 in order to stimulate the storage phosphor layer 5 to emit emission light. In the shown preferred embodiment, the module preferably comprises a laser diode 2, whereby the light emitting area of the laser diode 2 is optically coupled to an optical fiber 9 adapted to transmit stimulating light generated by the light source 2 between a proximal fiber end arranged at the light source 2 and a distal fiber end 23 which can be arranged in a remote location.

At the distal fiber end 23 of the optical fiber 9, the stimulating light beam 3 formed by the optical fiber 9 from the stimulating light generated by the light source 2 exits the optical fiber 9. By coupling the light source 2 to the optical fiber 9, the stimulating light generated by the light source 2 can be transmitted nearly losslessly to a remote location, where the stimulating light beam 3 is needed, without being bound to the straight propagation of light. Due to the properties of the optical fiber 9 as dielectric wave guide, the transmission follows any desired path and does not pose any danger of harm to the environment, which is particularly relevant in the preferred case of a high intensity laser diode 2. Furthermore, the coupling of stimulating light into an optical fiber removes an astigmatism which is generally found in light generated by laser diodes, especially when a Fabry-Perot-Laser diode is used. The elliptical form of a beam generated by the laser diode with generally a high aspect ratio is thereby formed to a round or at least rounder beam profile in the stimulating light beam 3.

Preferably, a so-called pigtailed laser diode and a standard plug are used to couple the laser diode to the optical fiber, for example a FC/PC-type-plug. Preferably, the optical fiber 9 can be unplugged and is therefore removably coupled, mechanically and/or optically, to the light source 2. By this, the optical fiber 9 used can be exchanged to realize, for example, different kinds of beam profiles. Alternatively or additionally, a FC/PC plug is provided at the distal end of the optical fiber 9 allowing for a simple exchange of the complete pigtailed laser diode.

Preferably, the optical fiber 9 further serves as a spectral filter selectively transmitting wave lengths. Therefore, when the spectrum in a stimulating light beam 3 has to be adapted, it may be sufficient to replace the optical fiber 9 without choosing a different laser diode 2, provided that the light emitted by the laser diode 2 has appropriate spectral characteristics. Preferably, the optical fiber 9 maintains also the polarization of the stimulating emission.

After leaving the fiber end 23 of the optical fiber 9, the generated stimulated light beam 3 has a certain divergence. This divergence is preferably corrected by a collimator 17 collimating the stimulating light beam 3. The collimator 17 is preferably a round lens and/or biconvex lens. In the further beam path, there is preferably arranged a mirror 21 for coupling out a part of the intensity of the stimulating light beam 3 which propagates partly through the mirror 21. However, the majority of the intensity of the stimulating light beam 3 is reflected at the mirror 21. The part coupled out is transmitted to a feedback sensor 19 used to control the power of the light source 2. The reflected majority of the intensity of the stimulating light beam 3 is then transmitted to a deflection element 4 which deflects the stimulating light beam 3 to a desired position on the storage phosphor layer 5, from which information is to be read out.

According to an alternative preferred embodiment, the mirror 21 may be designed to transmit the majority of the intensity of the stimulating light beam 3 impinging on the mirror 21 and to reflect only a small part thereof. Accordingly, in this preferred embodiment the deflection element 4 is arranged at a position behind the mirror 21 and the feedback sensor 19 is arranged at a position to which the part of the stimulating light beam 3 is reflected. In FIG. 2, the movement of the deflection element 4 is indicated by a double arrow which represents the movement of the deflection element 4 in the plane of the representation, but the deflection element 4 may also be moved in any other direction. Preferably, the deflection element 4 is a so-called Galvo, i.e. a galvanometer mirror, functioning as described with respect to FIG. 1. In the preferred embodiment shown in FIG. 2, there is provided between the deflection element 4 and the storage phosphor layer 5 an optical device 22 through which the deflected stimulating light beam 3' has to pass. This optical device 22 is preferably a post-scan optics by which the deflected stimulating light beam 3' is on the one hand focused onto the storage phosphor layer 1 and on the other hand its radial movement is converted into a linear movement along the line 8 on the storage phosphor layer 1.

Alternatively or in addition to post-scan optics 22, a so-called pre-scan optics, in particular comprising a variofocus element, can be provided which is preferably arranged in the beam path between the laser diode 2 and the deflection element 4 and forms the laser beam 3 such that after its deflection by the deflection element 4 a linear movement along the line 8 (see FIG. 1) on the storage phosphor layer 5 is also obtained. By this, post-scan optics can be dispensed with.

Alternatively or additionally to reading out a planar storage phosphor layer 5, the apparatus can be designed for reading out a curved storage phosphor layer 5. The course of the curvature of the storage phosphor layer 5 preferably corresponds substantially to the course of curvature of part of a lateral surface of a cylinder, the axis of which is aligned parallel to the direction of conveyance T running perpendicular to the plane of the drawing. Preferably, the axis of the cylinder of the lateral surface of the cylinder runs parallel to the oscillation axis of the deflection element 4. The advantage of this type of curvature compared to reading out a planar storage phosphor layer 5 is that one can dispense with special optical devices, for example the post-scan optics 22 between the deflection element 4 and the storage phosphor layer 5. This further simplifies the structure of the apparatus. In this way it is at the same time guaranteed that the deflected stimulating light beam 3' always strikes the respective section of the storage phosphor layer 5 substantially perpendicularly and also this leads to particularly high light yield when the emission light stimulated while at the same time avoiding negative effects upon the image quality to the scattering of stimulating light in the storage phosphor layer 5.

Figure 3:
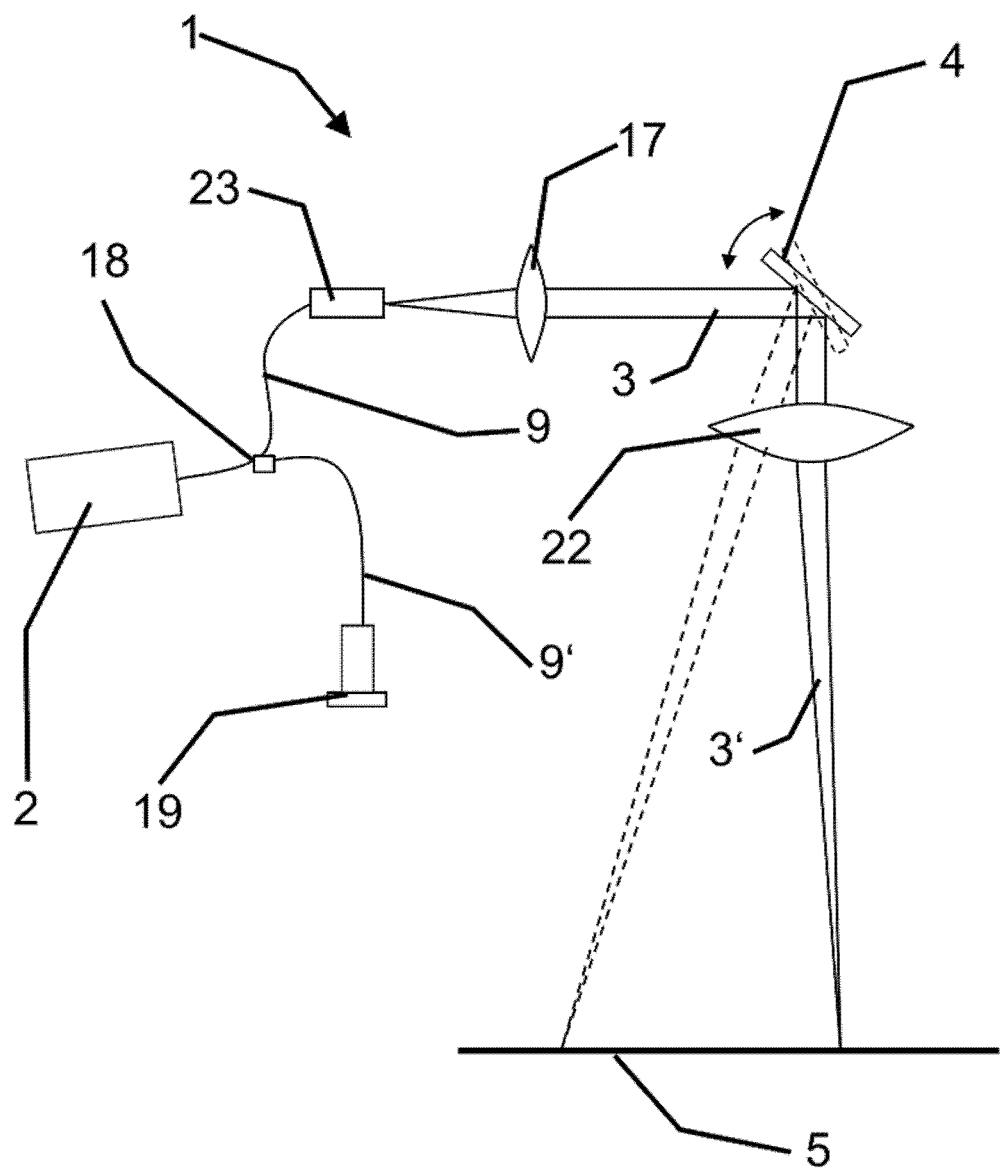
FIG. 3 is a schematic illustration of a further preferred embodiment of an optical module serving to provide stimulating light to the storage phosphor layer.

FIG. 3 illustrates a further preferred embodiment of the module of the inventive apparatus for sampling a storage phosphor layer 5 with a stimulating light beam 3. In this preferred embodiment, a fiberoptic splitter 18 is arranged in the optical fiber 9 between the light source 2 and the distal fiber end 23. The fiberoptic splitter 18 couples out a part of the intensity of the stimulating light generated by the light source 2 and coupled into the optical fiber 9. The light coupled out is then transmitted via a further optical fiber 9' to a feedback sensor 19. The fiberoptic splitter 19 therefore replaces the mirror 21 for coupling out light in the beam path of the stimulating light beam 3. By this, the optical module can further be reduced in size since the mirror 21 in the beam path can be removed and also the length of the beam path can be reduced. The feedback sensor 23 preferably delivers a signal back to the control unit 15, shown in FIG. 1, which then controls the light source 2 in order to provide an adequate intensity and/or duration of light exposure needed to read out the storage phosphor layer 5.

The invention claimed is:

1. An apparatus for reading out X-ray information stored in a storage phosphor layer, the apparatus comprising:
   a light source that generates stimulating light to stimulate the storage phosphor layer to emit stimulated light;
   an optical fiber optically coupled to the light source and that generates a stimulating light beam from the stimulating light received from the light source;
   a deflector that deflects the stimulating light beam to move the stimulating light beam over the storage phosphor layer; and
   a detector that detects the stimulated light emitted by the storage phosphor layer; wherein
   the optical fiber maintains a polarization of the stimulating light beam.

2. The apparatus according to claim 1, wherein the light source and the optical fiber define a fiber coupled laser diode module.

3. The apparatus according to claim 1, further comprising optics between the optical fiber and the deflector.

4. The apparatus according to claim 3, wherein the optics includes a collimator.

5. The apparatus according to claim 1, wherein the optical fiber includes a spectral filter.

6. The apparatus according to claim 1, wherein the optical fiber is removably coupled to the light source.

7. The apparatus according to claim 1, further comprising a fiberoptic splitter in the optical fiber to split at least a portion of the stimulating light beam and to feed the portion of the stimulating light beam to a feedback sensor to sense an intensity of the stimulating light beam.

8. The apparatus according to claim 1, wherein the detector detects the stimulated light emitted by the storage phosphor layer while the stimulating light beam deflected by the deflector moves over the storage phosphor layer in a first direction of movement, or while the deflector moves in a first direction.

9. The apparatus according to claim 1, further comprising a driver that drives the deflector by delivering a drive energy to the deflector dependent upon a location of the stimulating light beam deflected by the deflector, and/or dependent upon a position of the deflector.

10. The apparatus according to claim 9, wherein the deflector includes a magnetic element, and the driver includes an electromagnetic unit which interacts with the magnetic element to deliver the drive energy to the deflector.

11. The apparatus according to claim 9, wherein the deflector includes a reflective surface which is driven by the driver to oscillate.

12. The apparatus according to claim 9, wherein the deflector has a resonance frequency, and the driver drives the deflector at the resonance frequency.

\* \* \* \* \*